US012647321B2

(12) United States Patent
Forero et al.

(10) Patent No.: US 12,647,321 B2
(45) Date of Patent: Jun. 2, 2026

(54) HIERARCHICAL MANAGEMENT POLICIES FOR DATA QUEUES

(71) Applicant: The United States of America, as represented by the Secretary of the Navy, Arlington, VA (US)

(72) Inventors: Pedro Andres Forero, Bonita, CA (US); Dusan Radosevic, Poway, CA (US); John M. McInerney, La Mesa, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 98 days.

(21) Appl. No.: 18/818,288

(22) Filed: Aug. 28, 2024

(65) Prior Publication Data

US 2026/0067164 A1    Mar. 5, 2026

(51) Int. Cl.
*H04L 41/0894* (2022.01)
*H04L 41/0823* (2022.01)
*H04L 41/16* (2022.01)

(52) U.S. Cl.
CPC ...... *H04L 41/0894* (2022.05); *H04L 41/0823* (2013.01); *H04L 41/16* (2013.01)

(58) Field of Classification Search
CPC .. H04L 41/0894; H04L 41/0823; H04L 41/16
See application file for complete search history.

(56) References Cited

U.S. PATENT DOCUMENTS

| | | | | |
|---|---|---|---|---|
| 6,496,516 B1 * | 12/2002 | Dabecki | ............. | H04L 45/40 370/413 |
| 7,606,154 B1 * | 10/2009 | Lee | ............. | H04L 47/30 370/232 |

(Continued)

OTHER PUBLICATIONS

Kok-Lim Alvin Yau 1, (Senior Member, IEEE), Aqeel Raza SYED2, Wahidah HASHIM3 , (Member, IEEE), Junaid Qadir 4, (Senior Member, IEEE), Celimuge Wu 5, (Member, IEEE), and Najmul Hassan, Maritime Networking: Bringing Internet to the Sea, date of publication Apr. 9, 2019.*

(Continued)

*Primary Examiner* — Nicholas P Celani
*Assistant Examiner* — Wuji Chen
(74) *Attorney, Agent, or Firm* — Naval Information Warfare Center Pacific; Kyle Eppele; J. Eric Anderson

(57) ABSTRACT

A method for improving performance of a communications network comprising: using RL to develop a hierarchical policy framework to dynamically configure local flow-control and traffic-shaping policies in a multi-queue system, each queue having QoS and a traffic dynamic that differ from other queues; establishing first and second goals with a Queue System Management (QSM) policy for a BAM policy and a LFM policy respectively, wherein The BAM and LFM policies have a collection of BAM and LFM worker policies available to choose from; choosing, with the BAM policy, one of the BAM worker policies that best enable the BAM policy to achieve the first goal; choosing, with the LFM policy, one of the LFM worker policies for each queue that best enable the LFM policy to achieve the second goal; altering the first and second goals with the QSM policy dynamically according to a surrounding environment.

9 Claims, 7 Drawing Sheets

(56) References Cited

U.S. PATENT DOCUMENTS

| | | | | | |
|---|---|---|---|---|---|
| 7,668,177 | B1 * | 2/2010 | Trapp | | H04L 47/2475 |
| | | | | | 370/395.42 |
| 7,773,504 | B2 * | 8/2010 | Chew | | H04L 47/30 |
| | | | | | 710/57 |
| 8,443,444 | B2 * | 5/2013 | Wang | | H04L 63/1458 |
| | | | | | 726/23 |
| 10,728,097 | B1 * | 7/2020 | Chin | | H04L 41/0894 |
| 10,873,533 | B1 * | 12/2020 | Ismailsheriff | | H04L 47/2441 |
| 12,401,595 | B2 * | 8/2025 | Forero | | H04L 47/127 |
| 2002/0075803 | A1 * | 6/2002 | Zaharychuk | | H04L 47/2416 |
| | | | | | 370/231 |
| 2004/0136379 | A1 * | 7/2004 | Liao | | H04L 47/30 |
| | | | | | 370/254 |
| 2004/0264500 | A1 * | 12/2004 | Bansal | | H04L 47/32 |
| | | | | | 370/468 |
| 2005/0102297 | A1 * | 5/2005 | Lloyd | | H04L 61/4552 |
| 2007/0282986 | A1 * | 12/2007 | Childress | | G06Q 10/063 |
| | | | | | 709/223 |
| 2012/0002544 | A1 * | 1/2012 | Kokku | | H04W 28/0289 |
| | | | | | 370/232 |
| 2014/0096188 | A1 * | 4/2014 | Mont | | G06Q 10/0637 |
| | | | | | 726/1 |
| 2018/0091431 | A1 * | 3/2018 | Burbridge | | H04L 69/22 |
| 2018/0300174 | A1 * | 10/2018 | Karanasos | | G06F 9/4881 |
| 2019/0020572 | A1 * | 1/2019 | Hu | | H04L 45/08 |
| 2019/0044882 | A1 * | 2/2019 | Poorchandran | | H04L 47/80 |
| 2020/0412659 | A1 * | 12/2020 | Arditti Ilitzky | | H04L 43/087 |
| 2021/0092068 | A1 * | 3/2021 | Ismailsheriff | | H04L 47/22 |
| 2021/0112006 | A1 * | 4/2021 | Francini | | H04L 47/115 |
| 2021/0187733 | A1 * | 6/2021 | Lee | | G06N 20/00 |
| 2022/0179888 | A1 * | 6/2022 | Wang | | G06F 16/338 |
| 2022/0327198 | A1 * | 10/2022 | Simpson | | G06F 21/31 |
| 2023/0003826 | A1 * | 1/2023 | Parker | | G01S 5/0205 |
| 2023/0148158 | A1 * | 5/2023 | Bandarupalli | | H04L 67/1008 |
| | | | | | 709/224 |
| 2023/0155960 | A1 * | 5/2023 | Lee | | H04L 47/805 |
| | | | | | 370/235 |
| 2023/0319163 | A1 * | 10/2023 | Forero | | H04L 47/22 |
| | | | | | 709/224 |
| 2024/0388541 | A1 * | 11/2024 | Tourrilhes | | H04L 47/32 |
| 2025/0016105 | A1 * | 1/2025 | Forero | | H04L 47/127 |
| 2025/0168084 | A1 * | 5/2025 | Pham | | H04L 41/5025 |
| 2025/0219951 | A1 * | 7/2025 | Gupta | | H04L 47/6215 |
| 2025/0286824 | A1 * | 9/2025 | Zhou | | H04L 47/32 |
| 2025/0292091 | A1 * | 9/2025 | Smith | | G06N 3/063 |
| 2025/0338163 | A1 * | 10/2025 | Mamidwar | | H04L 47/2441 |

OTHER PUBLICATIONS

Pedro A. Forero, P. Zhang, and D. Radosevic; Active Queue-Management Policies for Undersea Networking via Deep Reinforcement Learning; OCEANS 2021: San Diego—Porto, San Diego, CA, USA, 2021, pp. 1-8, doi: 10.23919/OCEANS44145.2021.9706025.

* cited by examiner

*10*

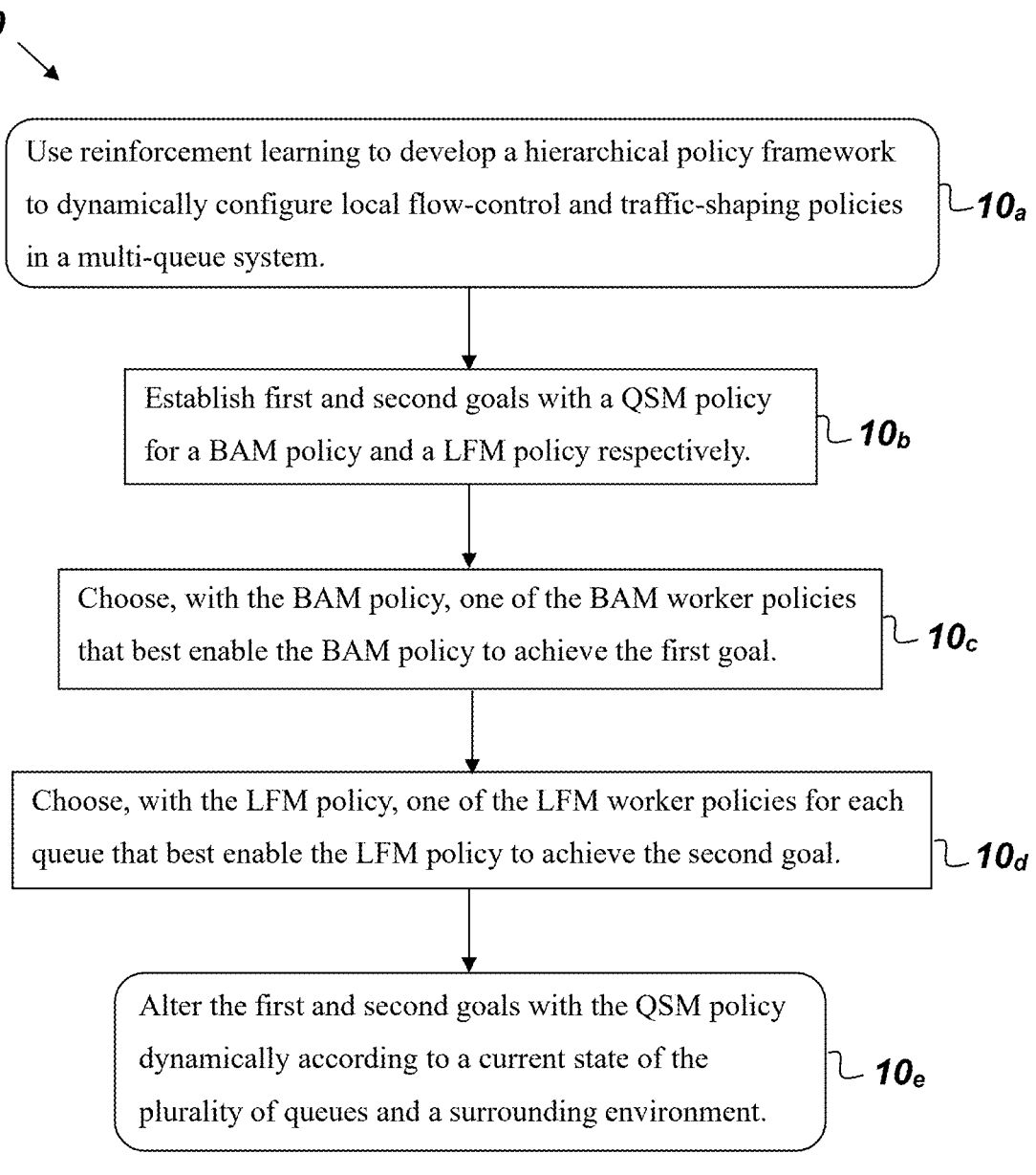

Use reinforcement learning to develop a hierarchical policy framework to dynamically configure local flow-control and traffic-shaping policies in a multi-queue system.

*10ₐ*

Establish first and second goals with a QSM policy for a BAM policy and a LFM policy respectively.

*10ᵦ*

Choose, with the BAM policy, one of the BAM worker policies that best enable the BAM policy to achieve the first goal.

*10ᵧ*

Choose, with the LFM policy, one of the LFM worker policies for each queue that best enable the LFM policy to achieve the second goal.

*10ᵈ*

Alter the first and second goals with the QSM policy dynamically according to a current state of the plurality of queues and a surrounding environment.

Figure 3:
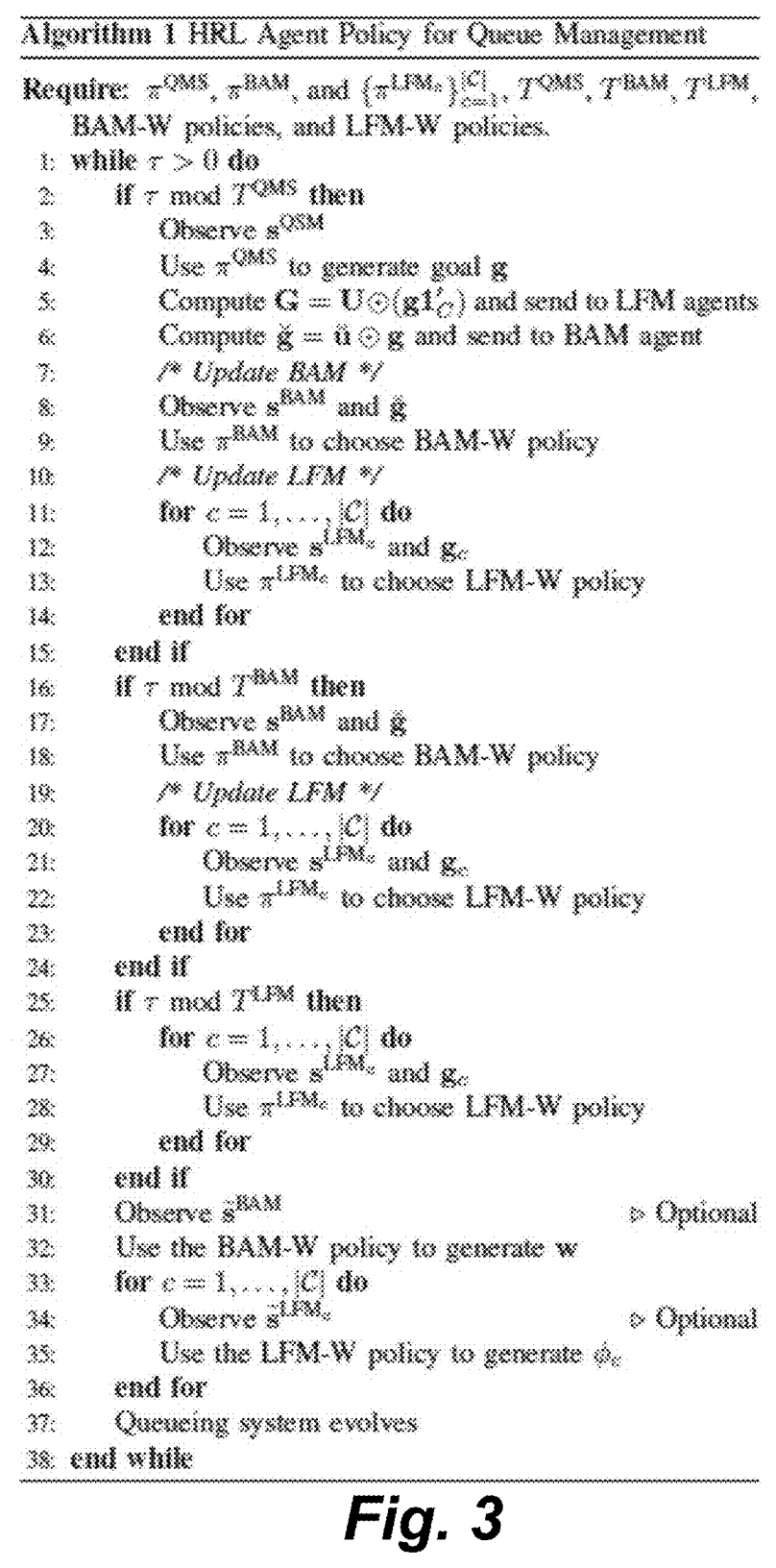

Algorithm 1 HRL Agent Policy for Queue Management

---

Require: $\pi^{OMS}$, $\pi^{BAM}$, and $(\pi^{LFM_c})_{c=1}^{|C|}$, $T^{OMS}$, $T^{BAM}$, $T^{LFM}$, BAM-W policies, and LFM-W policies.

1: while $\tau > 0$ do
2:     if $\tau \bmod T^{OMS}$ then
3:        Observe $s^{OSM}$
4:        Use $\pi^{OMS}$ to generate goal $g$
5:        Compute $G = U \odot (g1'_C)$ and send to LFM agents
6:        Compute $\check{g} = \check{u} \odot g$ and send to BAM agent
7:        /* *Update BAM* */
8:        Observe $s^{BAM}$ and $\check{g}$
9:        Use $\pi^{BAM}$ to choose BAM-W policy
10:       /* *Update LFM* */
11:       for $c = 1, \ldots, |C|$ do
12:          Observe $s^{LFM_c}$ and $g_c$
13:          Use $\pi^{LFM_c}$ to choose LFM-W policy
14:       end for
15:     end if
16:     if $\tau \bmod T^{BAM}$ then
17:       Observe $s^{BAM}$ and $\check{g}$
18:       Use $\pi^{BAM}$ to choose BAM-W policy
19:       /* *Update LFM* */
20:       for $c = 1, \ldots, |C|$ do
21:          Observe $s^{LFM_c}$ and $g_c$
22:          Use $\pi^{LFM_c}$ to choose LFM-W policy
23:       end for
24:     end if
25:     if $\tau \bmod T^{LFM}$ then
26:       for $c = 1, \ldots, |C|$ do
27:          Observe $s^{LFM_c}$ and $g_c$
28:          Use $\pi^{LFM_c}$ to choose LFM-W policy
29:       end for
30:     end if
31:     Observe $s^{BAM}$             ▷ Optional
32:     Use the BAM-W policy to generate $w$
33:     for $c = 1, \ldots, |C|$ do
34:       Observe $s^{LFM_c}$          ▷ Optional
35:       Use the LFM-W policy to generate $\check{\phi}_c$
36:     end for
37:     Queueing system evolves
38: end while

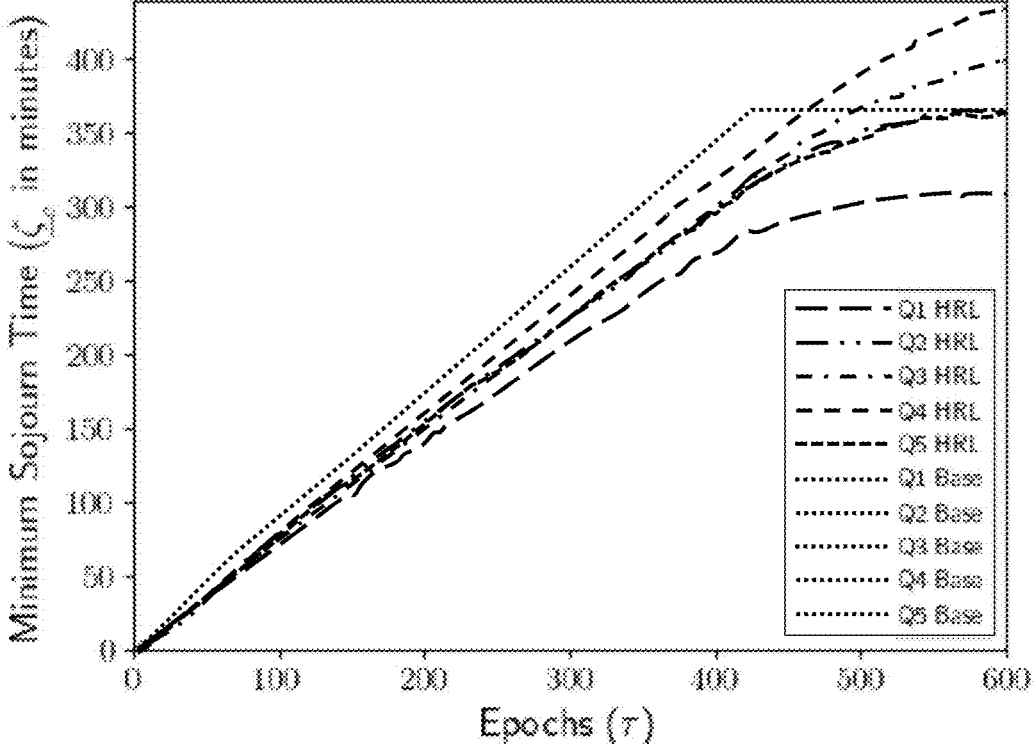
_Fig. 5_

HIERARCHICAL MANAGEMENT POLICIES FOR DATA QUEUES

FEDERALLY-SPONSORED RESEARCH AND DEVELOPMENT

The United States Government has ownership rights in the invention claimed herein. Licensing and technical inquiries may be directed to the Office of Research and Technical Applications, Naval Information Warfare Center Pacific, Code 72110, San Diego, CA, 92152; voice (619) 553-5118; NIWC_Pacific_T2@us.navy.mil. Reference Navy Case Number 211909. gist

BACKGROUND OF THE INVENTION

Congestion control and traffic shaping are critical functions that enable the delivery of quality of service (QoS) guarantees to different classes of communications network traffic. Intermittent lossy networking environments can degrade network performance. Traditional networking approaches use end-to-end congestion control protocols to limit the volume of data inserted in the network and avoid overwhelming intermediate nodes with more data than they can support. Traditional networking approaches also use traffic shaping algorithms to enforce preferred bandwidth utilization profiles for each traffic type across the network. Although congestion control and traffic shaping protocols aim to manage the ingress and egress of data to queues at intermediate network nodes, they do so at different timescales and are often unaware of each other's configuration. Being unable to promptly identify and react to congestion is a major challenge faced by typical congestion control algorithms, such as the Transmission Control protocol (TCP) in lossy, intermittent network environments. There is a need for an improved method for improving performance of an intermittent, lossy communications network.

SUMMARY

Disclosed herein is a method for improving performance of an intermittent, lossy communications network that comprises, consists of, or consists essentially of the following steps. A first step provides for using reinforcement learning to develop a hierarchical policy framework to dynamically configure local flow-control and traffic-shaping policies in a multi-queue system. The multi-queue system comprises a plurality of queues, with each queue configured to handle a corresponding data flow that has a QoS requirement and a traffic dynamic that differ from other queues in the multi-queue system. Another step provides for establishing first and second goals with a Queue System Management (QSM) policy for a Bandwidth Allocation Management (BAM) policy and a Local Flow Management (LFM) policy respectively. The BAM and LFM policies have a collection of predefined traffic shaping and congestion-control policies (hereinafter referred to as BAM and LFM worker policies) available to choose from. Another step provides for choosing, with the BAM policy, one of the BAM worker policies that best enable the BAM policy to achieve the first goal. Another step provides for choosing, with the LFM policy, one of the LFM worker policies for each queue that best enable the LFM policy to achieve the second goal. Another step provides for dynamically altering the first and second goals with the QSM policy according to a current state of the plurality of queues and a surrounding environment.

Also disclosed herein is a hierarchical reinforcement learning (HRL) agent for improving performance of an intermittent, lossy communications network comprising a QSM module, a BAM module, a plurality of LFM modules, and an LFM database. The QSM module is configured to observe a state of an environment surrounding the network, which comprises a plurality of queues. Each queue is configured to handle a corresponding data flow that has a QoS requirement and a traffic dynamic that differ from other queues in the plurality of queues. The BAM module is communicatively coupled to the QSM module and to a BAM database that contains low level BAM worker policies. In the plurality of LFM modules, one LFM module is associated with each queue. The LFM database contains low level LFM worker policies, and each of the LFM modules is communicatively coupled to the QSM module and to the LFM database. The QSM module is configured to establish a BAM goal and a LFM goal based on an observed state of the environment and the plurality of queues. The BAM module is configured to select a BAM worker policy that best enables the network to achieve the BAM goal. Each LFM module of the plurality of LFM modules is configured to select a LFM worker policy that best enables a corresponding queue to achieve the LFM goal.

BRIEF DESCRIPTION OF THE DRAWINGS

Throughout the several views, like elements are referenced using like references. The elements in the figures are not drawn to scale and some dimensions are exaggerated for clarity.

FIG. 1 is a flowchart of a method for improving performance of an intermittent, lossy communications network.

FIG. 3 is an example execution of a hierarchical policy.

FIG. 5 is a plot of data.

DETAILED DESCRIPTION OF EMBODIMENTS

Figure 2:
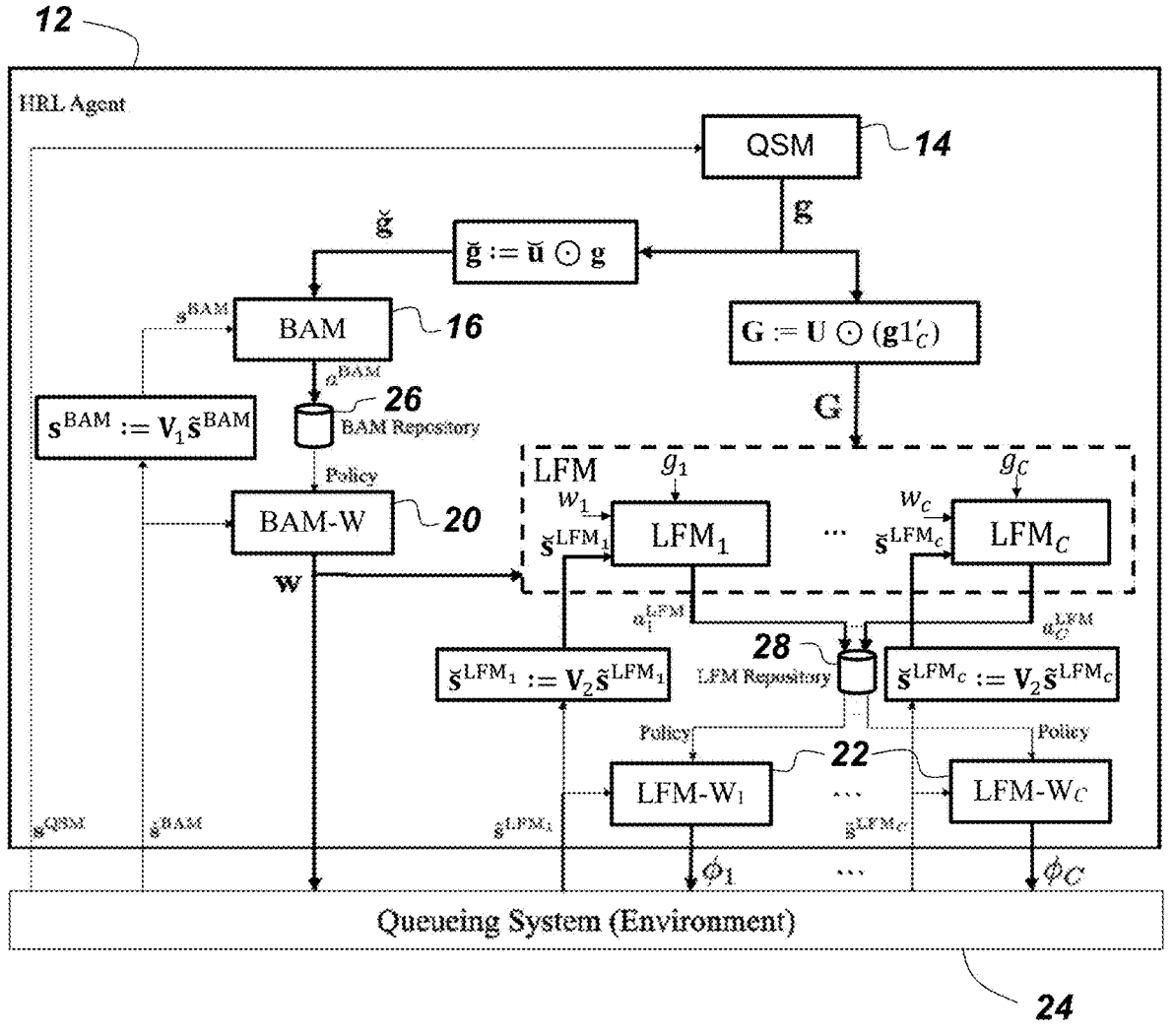
FIG. 2 is a block diagram showing a hierarchical policy structure of an HRL agent.

The disclosed methods and HRL agents below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

FIG. 1 is a flowchart of a method 10 for improving performance of an intermittent, lossy communications network that comprises, consists of, or consists essentially of the following steps. A first step $10_a$ provides for using reinforcement learning on a computer to develop a hierarchical policy framework to dynamically configure local flow-control and traffic-shaping policies in a multi-queue system. The multi-queue system comprises a plurality of queues, with each queue configured to handle a corresponding data flow that has a QoS requirement and a traffic dynamic that differ from other queues in the multi-queue system. Each queue represents a flow of packets that are traversing through a single node. A queue may correspond to either an individual flow or a class of traffic. There may be multiple queues in a single network node to handle different network traffic based on QoS requirements. Another step $10_b$ provides for establishing first and second goals with a QSM policy for a BAM policy and a LFM policy respectively. The BAM and LFM policies have a collection of predefined BAM and LFM worker policies available to choose from. Another step $10_c$ provide for choosing, with the BAM policy, one of the BAM worker policies that best enable the BAM policy to achieve the first goal. Another step $10_d$ provides for choosing, with the LFM policy, one of the LFM worker policies for each queue that best enable the LFM policy to achieve the second goal. Another step $10_e$ provides for altering the first and second goals with the QSM policy dynamically according to a current state of the plurality of queues and a surrounding environment.

By not using a fixed configuration for congestion control and traffic shaping policies, Method 10 may be used to improve suboptimal performance due to the impact of environmental parameters on network performance. Embodiments of method 10 may use reinforcement learning to develop a hierarchical policy framework to dynamically configure local flow-control and traffic-shaping policies in a multi-queue system while seeking to achieve goals established by the hierarchical policy. For example, one embodiment of method 10 uses goals set by the hierarchical policy framework and high-level management policies to dynamically influence lower level networking policies, specifically supporting data queueing. Each queue in the multi-queue system may be part of a network node. In a maritime network embodiment, each queue may be implemented in a dedicated data cache (memory) within a maritime platform, suitable examples of which include, but are not limited to, a buoy, a sensor, an unmanned, underwater vehicle (UUV), and an unmanned surface vehicle (USV). A node can also be a buoy (with an acoustic or RF modem.

With respect to the reinforcement learning used in step $10_a$, in general, the goal is to enable an agent, which may be embodied in a computer software module, to learn a decision-making policy based on the agent's interactions with the underlying environment. Characteristics/features of the underlying environment may include, but are not limited to, connection type and state between nodes, the presence of any obstacles or interference that would impede/block communications between any of the nodes, and an internal state of a MAC/Data Link layer and physical layer queues. In this context, the agent may be configured to observe the state of the environment, decide what action to execute, observe the new state of the environment after the action was executed, and then to receive a reward. Reinforcement learning is a powerful technique for developing policies that interact with complex, dynamic, and uncertain environments. In the context of queue management, embodiments of method 10 use reinforcement learning algorithms for congestion control and traffic shaping that work together under a common framework. Embodiments of method 10 use HRL to develop a multi-layer policy to manage a queueing system. Only policies at the bottom of the policy hierarchy interact directly with the queueing system. Our queueing system comprises multiple queues handling data flows with different QoS requirements and traffic dynamics. Although hierarchical policy decompositions can simplify the training of the queue management system, learning the hierarchy of policies may require concurrent training across all levels of the hierarchy. Doing so can be challenging due to the different time scales at which the policies in the hierarchy must operate.

Rather than learning a full hierarchy of policies, embodiments of method 10 may focus on the development of high-level policies that have at their disposal a collection of predesigned policies to choose from—specifically, BAM and LFM policies whose activities are coordinated by the QSM policy. The QSM policy acts as a high-level manager that sets goals for the BAM and LFM policies. The BAM and LFM policies may be stored in databases and may have a collection of predefined traffic shaping and congestion-control policies available to choose from. From this vantage point, our HRL framework can be seen as multi-level options framework with predefined options. Here, options refer to the set of policies from which the BAM and LFM policies can choose low-level policies to use in order to achieve the goal set forth by the QSM policy. This approach allows method 10 to take advantage of well-known or learned policies for traffic shaping and congestion control, and to emphasize the management role of the QMS in response to the dynamics of the queueing system. The HRL framework, however, does not preclude extensions for jointly learning the low-level policies via, e.g., extensions of the option-critic architecture. For example, low-level policies (e.g., LFM-W and BAM-W) can be trained on the fly, as the QSM is being trained.

The following is a discussion of a proposed embodiment of method 10 that involves a queueing system with C queues where $Q_c > 0$ defines the storage space allocation for queue $c \in C := \{1, \ldots, C\}$. Each queue is responsible for transporting packets from a given traffic class $c \in C$, with each class aggregating multiple packet streams, i.e., flows. Each queue is modeled as a first in, first out (FIFO) queue capable of using a modified tail-drop policy for deciding when to drop packets. Our modified tail-drop policy allows control for when and what portion of packets to drop, even when the queue is not full. Thus it controls the local flow of packets per queue. The goal of dropping packets is to send an early signal upstream toward the source of the packet flow indicating congestion. To that end, a state variable $\phi_c \in \Phi$, where $\Phi$ defines a set of $|\Phi|$ operational states, may be introduced per queue. States in $\Phi$ define the number of packets that can be enqueued in the queue if enough space is available. While in a given state $\phi \in \Phi$, the fraction of packet arrivals that can be enqueued is controlled via a randomized procedure that upon arrival of a new packet chooses to drop the packet with probability $p_\phi \in [0, 1]$. Packets allowed to be enqueued may be enqueued following their arrival order if there is enough free space available in the queue. Normal ($p_1=0$) and paused ($p_{|\Phi|}=1$) operation states are always included in $\Phi$.

Packets may be forwarded from the queueing system using a packet scheduler that together with a dynamic class-based weighted fair-queueing (CBWFQ) policy defines the number of packets from each class to be transmitted and the order in which they are transmitted. Given a transmission bandwidth B, the bandwidth allocation per queue may be defined via the weight vector $w:=[w_1, \ldots, w_C]'$, with $$w_c \geq \forall_C, 1'_C w = 1, 1_C \in \mathbb{R}^C$$

denoting a vector of ones, and $(\cdot)'$ the transpose operator, where $\mathbb{R}$ is a set of real numbers. The CBWFQ policy can capture QoS and priority requirements associated with each traffic class. Predefined traffic class priorities may be used to indicate a user transmission preference per traffic class. The coefficients $\{\alpha_1, \ldots, \alpha_C\}$, with $\alpha_c > 0 \forall_C \in C$ and $\alpha_c \neq \alpha_{c'} \forall_C$, $c' \in C$, indicating the priority of traffic class c, define the user-preferred ordering of traffic classes. Thus, $\alpha_{c_i} > \alpha_{c_j}$, $c_i$, $c_j \in C$, implies that traffic class $c_i$ is higher priority than traffic class $c_j$. In our framework, the CBWFQ policy weights w can be dynamically adjusted.

Preferably, method 10 develops BAM and LFM policies that select w and $\phi:=[\phi_1, \ldots, \phi_C]'$ dynamically and with the goal to reduce packet losses and sojourn times. The BAM and LFM policies observe the state of the queueing system and receive guidance, in the form of objectives to be accomplished, from the QMS policy. The BAM, LFM, and QMS policies are structured in a hierarchical manner and linked to the collection of predefined BAM and LFM worker policies from which the working policies that ultimately define w and $\phi$ are selected.

FIG. 2 is a block diagram showing a hierarchical policy structure of an HRL agent 12 that may be used with method 10. The hierarchical policy structure endows the HRL agent 12 with a hierarchy of policies that interact with each other via explicit goals and actions. Each policy in the hierarchy operates at different levels of temporal resolution with lower level policies operating at finer temporal resolutions and highest level policies operating at coarser temporal resolutions. Additionally, each policy is able to access specialized views of the state of the queueing system. Higher-level policies observe coarser views of the state that align with the temporal resolution (i.e., from a few minutes to several hours) at which the higher-level policies are expected to operate. Lower-level policies observe finer views of the state that align with the temporal resolution (i.e., from a few milliseconds to few minutes) at which the lower-level policies are expected to operate. A detailed example is provided below. The hierarchical policy structure for HRL agent 12 includes a QSM policy 14, BAM policy 16, LFM policies 18 (one for each of the C queues), BAM worker (BAM-W) policies 20, and LFM worker (LFM-W) policies 22. Note that individual instances of the LFM policies 18 and the LFM-W policies 22 are deployed with each queue/node in the queueing system 24. The LFM 18 and LFM-W 22 assigned to the c-th queue are denoted as $LFM_c$ and $LFM$-$W_c$ respectively. After observing the state vector $s^{QSM} \in \mathbb{R}^{M_0}$, the QSM policy 14 is responsible for providing a high-level goal in the form of a vector $g \in \mathbb{R}^2$ to the BAM

6 and LFM policies. Vector g defines aggregate packet loss and packet sojourn-time goals for the queueing system. This vector is mapped to the goal-vector for the BAM policy $\breve{g}:=\breve{u} \odot g$, where $u \in \mathbb{R}^2$ and $\odot$ denotes the Hadamard product. In the case of the LFMs, g is mapped to $G \in \mathbb{R}^{2 \times C}$ via the mapping $$G := U \odot (g 1'_C)$$

where $U:=[u_1, \ldots, u_C] \in \mathbb{R}^{2 \times C}$. The c-th column of G, denoted $g_c$, defines the goals for the LFM policy managing the c-th queue, i.e., $LFM_c$. In our context a goal corresponds to the desire for a relative change in the state of the queuing system. QSM collects statistics from the queues implemented within the nodes. For example, in a Linux system one can use the Linux kernel and qdiscs or queueing disciplines available within it to collect data from a given node.

Still referring to FIG. 2, in turn, the BAM 16 and each of the LFM 18 policies choose actions $a^{BAM}$ and $$a^{LFM} := [a_1^{LFM}, \ldots, a_C^{LFM}]$$

that select a BAM-W policy 20 and LFM-W policies 22, respectively. The BAM 16 and BAM-W 20 observe the state vectors $s^{BAM}$ and $\breve{s}^{BAM} \in \mathbb{R}^{M_1}$, respectively, where $s^{BAM}:=V_1 \breve{s}^{BAM}$, with $V_1 \in \mathbb{R}^{M_2 \times M_1}$ and M2<M1 offers a reduced view of the state to the BAM policy 16. Similarly, every $LFM_c$ 18 and $LFM$-$W_c$ 22 observes state vectors $$[\breve{s}^{LFM'_c}, w_c]'$$

and $\breve{s}^{LFM_c} \in \mathbb{R}^{M_1}$, respectively, where $\breve{s}^{LFM_c}:=V_2 \breve{s}^{LFM_c}$, with $V_2 \in \mathbb{R}^{M_4 \times M_3}$ and M4<M3 offers a reduced view of the state of the c-th queue to the $LFM_c$ policy. Giving access to a reduced state representation to the BAM policy 16 and the LFM policies 18 can encourage faster learning, and reduced their sensitivity to state variability and thus induce better generalization.

The worker policies 20 and 22 may be chosen from repositories (e.g., BAM database 26 and LFM database 28) in which predefined CBWFQ and local flow-control policies may be stored. The worker policies are chosen by the BAM 16 and LFM 18 to drive the state of the queuing system 24 towards the goals sets forth by the QSM 14, i.e., towards a desired state. The chosen worker policies generate primitive actions, i.e., actions that execute in a single time step, defining the w and $\phi$ used to control the CBWFQ policy and the modified tail-drop policies per queue. Policies at different levels of the hierarchy operate at different levels of temporal resolution. For example, the finest temporal resolution is used by the LFM and LFM-W policies and is hereafter referred to as an epoch. During an epoch with nominal duration $T=T^{LFM}$, multiple packets are received and transmitted by the queueing system. Both LFM and LFM-W decisions are performed synchronously. Likewise, the BAM and BAM-W policies operate at the same temporal resolution of $T^{BAM}:=k_1 T^{LFM}$ epochs, with $k_1 \in \mathbb{N}_+$. The QSM 14 operates at the coarsest temporal resolution of $T^{QSM}=k_1 k_2 T^{LFM}$ epochs, $k_2 \in \mathbb{N}_+$. Using heuristics or an options framework a possible alternative for defining the times at which g, $a^{BAM}$ and $a^{LFM}$ should be decided. In one example embodiment, The QSM policy 14 may be configured to run every eight epochs, the BAM policy 16 may be configured to run every four epoch, and the LFM policy may be configured to run every epoch. The temporal resolutions of the various policies may be dynamic based on the conditions.

This section introduces an embodiment of a multiagent RL framework proposed for the HRL agent 12 to learn the policies described above. This section also describes the decision-making process that may be followed by the HRL agent 12 as it interacts with the queueing system 24. A Markov Decision Process (MDP) model may be used to describe an evolution of the BAM, LFM, BAM worker, and LFM worker policies in response to the current state of the queueing system 24. In other words, MDP formalism may be used to describe the evolution of individual policies within the HRL agent 12 as they interact with exogenous elements, i.e., the environment and other policies. The aggregate behavior of all policies defines the behavior of the HRL policy and, thus, that of our HRL agent 12. One may model each policy-block composing the HRL agent 12 as an individual pseudo-agent, and define its state (action) space $\mathcal{S}(\mathcal{A})$ and the decision epoch index $\tau$, which defines the time scale at which it operates. Each pseudo-agent observes the state of the system $s(\tau) \in \mathcal{S}$ and decides the action $a(\tau) \in \mathcal{A}$ to execute. The environment evolves to a new state $s(\tau+1) \in \mathcal{S}$ and the pseudo-agent receives a reward $r(\tau+1) \in \mathbb{R}$. The dynamics of the environment may be characterized by a set of transition probabilities $\mathcal{P}$ that describe the probability of the environment to transition to a new state s' and receive reward $r'$ given that the environment is currently in state s and the pseudo-agent takes action a. In our context, the probabilistic transitions of the environment are due to the stochastic nature of the traffic and available transmission bandwidth.

Let $\ell_c(\tau) \in [0,1]$ denote the packet loss rate experienced by the c-th queue during epoch $\tau$, $\underline{\zeta}_c(\tau) \in \mathbb{R}_+ \cup \{\infty\}$ the smallest sojourn time experienced by a packet when traversing the c-th queue during epoch $\tau$, and, $\overline{\zeta}_c(\tau) \in \mathbb{R}_+ \cup \{\infty\}$ the largest sojourn time experienced by a packet when traversing the c-th queue during epoch $\tau$. If there are no packets dequeued from a given queue, for example the c-th queue, during epoch $\tau$, its corresponding $\zeta_c(\tau) = \infty$. To simplify notation, we use the superscript of the epoch index to indicate the period over which observations are collected. The major elements of each MDP for the pseudo-agents, i.e., the policies composing the HRL agent 12, are described in the next few paragraphs.

(1) QSM: For the QSM pseudo-agent the decision epoch index is $\tau^{QSM}$ and its epoch duration is $T^{QSM}$.

State Space: The state of the environment as perceived by the QSM pseudo-agent is defined as $s^{QSM} := [\overline{\ell}(\tau^{QSM}), \underline{\zeta}^{max}(\tau^{QSM})]' \in \mathbb{R}^2$, where $$\overline{\ell}(\tau^{QSM}) := C^{-1} \sum_{c=1}^{c} \ell_c(\tau^{QSM}) \text{ and } \underline{\zeta}^{max}(\tau^{QSM}) = \max_c \underline{\zeta}_c(\tau^{QSM}).$$

Action Space: In this case $\mathcal{A}^{QSM} := [-\gamma, \gamma]^2$. An action $a^{QSM} = g \in \mathcal{A}$, where $g \in [-\gamma, \gamma]^2$, with $\gamma \in [0,1]$, is the goal vector that defines the relative change in the average packet loss rate and largest sojourn time that the pseudo-agent would like to achieve. Vector g is mapped to state-goals for the LFM and BAM policies via U and $\breve{u}$. For each queue $c \in C$, the entries of $u_c$ are set to the average packet loss and largest packet sojourn times observed at the c-queue. Similarly, the entries of $\breve{u}$ are set to the average packet loss and largest packet sojourn times across all queues.

Reward Function: The reward function for the QSM pseudo-agent may be defined as:

$$r^{QSM}(\tau^{QSM} + 1) = [1 - \overline{\ell}(\tau^{QSM})] + C \cdot \min_c \underline{\zeta}_c^{-1}(\tau^{QSM}) \qquad \text{Eq. (1)}$$

where C>0 is a tuning parameter.

(2) BAM: For the BAM pseudo-agent, the decision epoch index is $\tau^{BAM}$ and its epoch duration is $T^{BAM}$.

State Space: With $q_c(\tau^{BAM}) \in \mathbb{R}_+$, denoting the size of queue c at the end of epoch $\tau^{BAM}$, the state of the environment as perceived by the BAM pseudo-agent is given by $$s^{BAM} := [s_1^{BAM'}, \ldots, s_{|C|}^{BAM'}]' \in \mathbb{R}^{20},$$

where $$s_c^{BAM} := [\ell_c(\tau^{BAM}), \underline{\zeta}_c(\tau^{BAM}), \overline{\zeta}_c(\tau^{BAM}), \tilde{q}_c(\tau^{BAM})]' \in \mathbb{R}^4$$

where $\tilde{q}_c(\tau^{BAM}) := q_c(\tau^{BAM})/Q_c$ denotes the queue occupancy percentage $\tilde{q}_c(\tau^{BAM}) = q_c(\tau^{BAM})/Q_c$.

Action Space: In this case $\mathcal{A}^{BAM} := \{1, \ldots, \Pi^{BAM}\}$ where $\Pi^{BAM}$ denotes the number of BAM-W policies available to choose from in the BAM repository (i.e., BAM database 26).

Reward Function: The reward function is given by the progress that the agent has made towards achieving the goal set by the QMS policy:

$$r^{BAM}(\tau^{BAM} + 1) = 1 - \frac{\|\zeta(\tau^{BAM}) - \breve{u}(\tau^{QSM})\|_2}{\|\zeta(\tau^{QSM}) - \breve{u}(\tau^{QSM})\|_2} \qquad \text{Eq. (2)}$$

where $\breve{u}(\tau^{QSM})$ denotes the goal established by the QSM pseudo-agent at the end of the last $\tau^{QSM}$ epoch, $\zeta(\tau^{BAM}) := [\overline{\ell}(\tau^{BAM}), \underline{\zeta}^{max}(\tau^{BAM})]'$, and $\zeta(\tau^{QSM}) := [\overline{\ell}(\tau^{QSM}), \underline{\zeta}^{max}(\tau^{QSM})]$ the state variables observed at the end of the last $\tau^{QSM}$ epoch.

(3) LFM: For the LFM pseudo-agents, the decision epoch index is $\tau^{LFM}$ and is epoch duration is $T^{LFM}$. The LFM pseudoagents operate synchronously with each other.

State Space: With $q_c(\tau^{LFM}) \in \mathbb{R}_+$ denoting the size of queue c at the end of epoch $\tau^{LFM}$, the state of the environment as perceived by the $LFM_c$ pseudo-agent is given by $s^{LFM_c} := [\ell_c(\tau^{LFM}), \underline{\zeta}_c(\tau^{LFM}), \overline{\zeta}_c(\tau^{LFM}), \tilde{q}_c(\tau^{LFM}), w_c]' \in \mathbb{R}^5$. Note that $w_c$ is updated by the BAM-W policy every $k_1 \cdot \tau^{LFM}$ epochs.

Action Space: In this case $\mathcal{A}^{LFM} := \{1, \ldots, \Pi^{LFM}\}$ where $\Pi^{LFM}$ denotes the number of LFM-W policies available to choose from in the LFM repository (i.e., LFM database 28). For each $LFM_c$, an action $a(\tau^{LFM})^{LFM_c} \in \mathcal{A}^{LFM}$ denotes the LFM-W policy chosen by the LFM-W$_c$ pseudo agent. Note that multiple LFM-W's can use the same underlying policy.

Reward Function: The reward function for each LFM$_c$ pseudo-agent is given by the progress that the agent has made towards achieving the goal set by the QMS policy:

$$r^{LFM_c}\left(\tau^{LFM_c}+1\right)=1-\frac{\left\|\zeta_c\left(\tau^{LFM}\right)-u_c\left(\tau^{QSM}\right)\right\|_2}{\left\|\zeta_c\left(\tau^{QSM}\right)-u_c\left(\tau^{QSM}\right)\right\|_2} \qquad \text{Eq. (3)}$$

where $u_c(\tau^{QSM})$ denotes the goal established by the QSM pseudo-agent at the end of the last $\tau^{QSM}$ epoch, $\zeta_c(\tau^{LFM}):=[\ell_c(\tau^{LFM}), \zeta_c(\tau^{LFM})]'$, and $\zeta_c(\tau^{QSM}):=[\ell_c(\tau^{QSM}), \zeta_c(\tau^{QSM})]$ the state variables observed at the end of the last $\tau^{QSM}$ epoch.

(4) BAM-W and LFM-W: The BAM-W and LFM-W pseudo-agents represent predefined policies available in the BAM and LFM repositories. These policies can be learned via RL, defined by an expert system, or implemented as fixed policies. Their action spaces are $$\mathcal{A}^{BAM-W}:=\left\{w\in\mathbb{R}^C\,|\,[w]_c>0\,\forall\,c,\,1'_C w=1\right\},$$

and $\mathcal{A}^{LFM-W}:=\Phi$, respectively. When learned via RL, the reward function for each policy can be designed to focus on specific goals. Furthermore, multiple policies using a common reward can be trained under different environment conditions to offer the BAM and LFM pseudo-agents additional flexibility to accomplish the objectives set forth by the QSM pseudo-agent.

Within an RL framework, the agent seeks to learn a parameterized policy $\pi_\theta: \mathcal{S}\to\mathcal{A}$ that maps the observed state of the environment $s\in\mathcal{S}$ into an action $a\in\mathcal{A}$, where $\theta$ denotes a set of deterministic parameters defining the policy. Typically, RL seeks the policy that maximizes the expected sum of rewards given by $$\max_{\pi_\theta\in\Pi}\mathbb{E}_{\pi\theta}\left[\sum_{\tau=0}^{\infty}\eta^\tau r(s(\tau),a(\tau))\right] \qquad \text{Eq. (4)}$$

Where $\eta\in(0,1)$ is a discount factor, $\Pi$ defines the set of feasible policies $\pi$, and the expectation $\mathbb{E}_\pi$ is taken over the state-action marginal distribution of the pair (s, a) trajectory induced by $\pi$.

One may use the Proximal Policy Optimization (PPO) algorithm to learn the QSM, BAM and LFM policies $\pi^{QMS}$, $\pi^{BAM}$, and $$\left\{\pi^{LFM_c}\right\}_{c=1}^{|C|}.$$

Each instance of PPO is configured with a different value of $\eta$ in accordance to the time horizon of the pseudo-agent's task. Agents higher in the hierarchy oversee longer sequences of tasks and thus are given a higher $\eta$-value. Agents lower in hierarchy oversee shorter sequences of tasks and thus are given lower $\eta$-value. PPO is an RL algorithm that can be used to learn a parameterized policy $\pi_\theta$. It is a policy gradient algorithm that uses the clipped surrogate loss function:

$$J^{Clip}(\theta)= \qquad\qquad\qquad\qquad\qquad\qquad\qquad \text{Eq. (5)}$$
$$\hat{\mathbb{E}}(\tau)\left\{\min\left[\beta(\tau;\theta)\hat{A}(s(\tau),a(\tau)),\,\text{clip}(\beta(\tau;\theta),1-\epsilon,1+\epsilon)\hat{A}(s(\tau),a(\tau))\right]\right\}$$

where $\hat{\mathbb{E}}$ denotes the empirical expected value, $\epsilon\in(0,1)$, the function clip(x, $1-\epsilon$, $1+\epsilon$) clips the value of the scalar x to be within $[1-\epsilon, 1+\epsilon]$, $\beta(\tau;\theta):=\pi_\theta(a(\tau)|s(\tau))/\pi_{\theta^{old}}(a(\tau)|s(\tau))$ the ratio between the policies defined by $\theta$ and the old policy $\pi_{\theta^{old}}$ defined by $\theta^{old}$, and the advantage function estimator $\hat{A}(s(\tau), a(\tau))$. The objective function in Equation (5) removes the incentive for choosing a $\theta$ that will cause $\beta(\tau;\theta)$ to go outside the interval $[1-\epsilon, 1+\epsilon]$. After applying the minimum operator, Equation (5) becomes a lower bound for the classical policy gradient objective $\beta(\tau;\theta)\hat{A}(s(\tau), a(\tau))$.

FIG. 3 is an example embodiment execution, referred to herein as Algorithm 1, of a hierarchical policy according to method 10. Once the policies for each pseudo-agent have been trained via PPO, the HRL agent 12 can execute its hierarchical policy as summarized in Algorithm 1 below. Note that goal updates from QMS trigger updates on the BAM and LFMs. Steps 31 and 34 in Algorithm 1 are optional and their execution depends on the type of BAM-W and LFM-Ws used.

Figure 4:
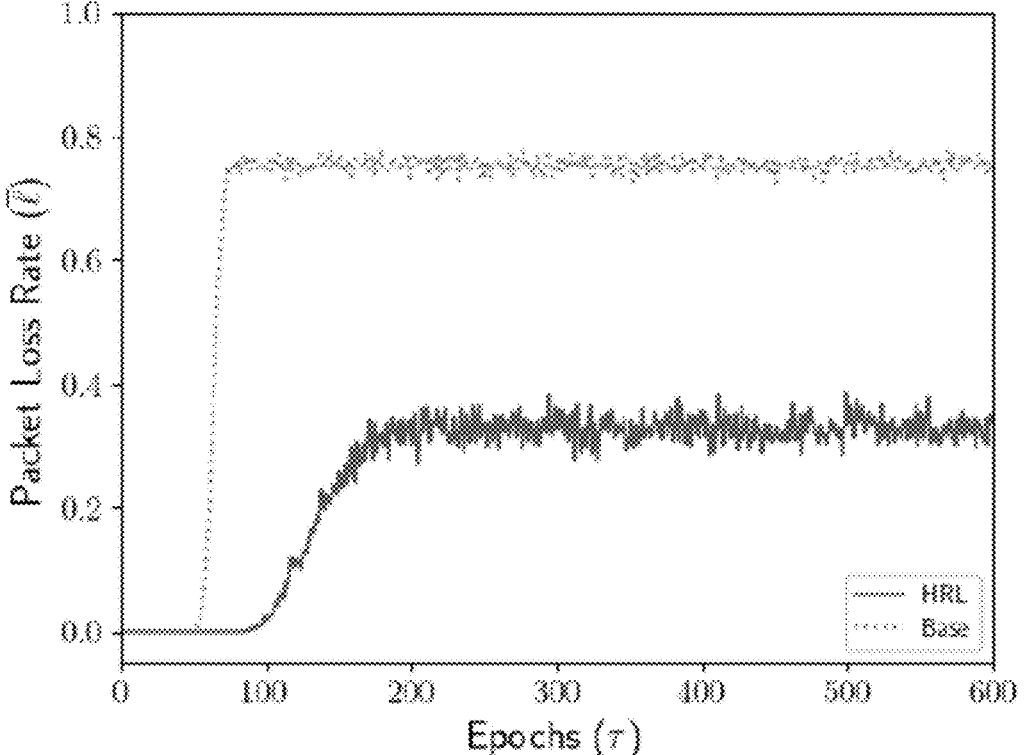
FIG. 4 is a plot of data.

FIG. 4 is a plot of data showing an average packet loss rate across all queues of an example, simulated embodiment of the queueing system 24 where C=5. In this example embodiment, all queues have the same size $Q_c$=2.25 MB, $\forall c$. The traffic load per queue was modeled via a Poisson Process whose arrival rates are varied in the set {1, 2, . . . , 11} packets per second. Packet arrival times were exponentially distributed in the decision epoch interval T, which was set to T=60 seconds. Packets sizes were modeled as random variables distributed in the interval [100, 150] bytes. The maximum bandwidth available to the queuing system for transmission was set to B=600 bytes per second. The queueing environment was implemented in Python 3.10 using the Gymnasium class for implementing reinforcement learning algorithms.

Still referring to FIG. 4, the HRL algorithm was trained using the PPO implementation available in a RL library such as disclosed in the paper "RLlib: Abstractions for distributed reinforcement learning," by E. Liang et al. in Proceedings of the 35th International Conference on Machine Learning, ser. Proceedings of Machine Learning Research, J. Dy and A. Krause, Eds., vol. 80. PMLR, 10-15 Jul. 2018, pp. 3053-3062, which RL library is incorporated herein by reference. The PPO algorithms for each pseudo-agent were configured with the same deep neural network architecture and the following values for $\eta$: $\eta^{QSM}$=0.99 for the QSM pseudo-agent, $\eta^{BAM}$=0.8 for the BAM pseudo-agent, and $\eta^{LFM}$=0.3 for the LFM pseudo-agents. The values chosen for $\eta$ define the horizon over which each pseudo-agent attempts to maximize its own reward. The duration of the epochs for each policy were set to $T^{LFM}$=T, $T^{BAM}$=4T, and $T^{QSM}$=8T. Ray Tune was used to explore different parameter settings including the configuration of the deep neural networks implemented within the PPO algorithms.

Still referring to the simulated embodiment of the queueing system 24 referred to above, a total of 7 BAM-W policies and 10 LFM-W policies were available for the BAM and LFM policies to choose from. The BAM-W policies were defined by the following vectors w were chosen: $w_1$:=0.2*1, $w_2$:=[1, 0, 0, 0, 0], $w_3$:=[0, 1, 0, 0, 0], $w_4$:=[0, 0, 1, 0, 0], $w_5$:=[0, 0, 0, 1, 0], $w_6$:=[0, 0, 0, 0, 1], and $w_7$:=(1.0/14.0)·[6, 4, 2, 1, 1]. The LFM-W policies were deep RL policies trained using the framework described in the paper "Toward congestion control in lossy networks via local queue-management policies" by P. A. Forero et al. in Proc. of IEEE Military Communications Conference (MIL-COM), November 28-December 2, Rockville, MD 2022, pp. 879-886, which paper (hereinafter referred to as the Forero Paper) is incorporated by reference herein. Each LFM-W was trained with the goal of either improve the packet acceptance rate or minimize the sojourn time experienced by the packets traversing the queue. In both cases the LFM-W policies were penalized for pausing the flow. Additionally, each LFM-W policy was trained for a specific traffic load regime in which the arrival rate of the Poisson process defining the queue was chosen in the set $\{1, 2, \ldots, 11\}$ packets per second and kept fixed. The LFM policy can thus choose LFM-W's trained for specific traffic loading conditions and with specialized goals. The LFM-W policies had three operation states, namely normal, paused and reduced-speed operation in which the reduced speed state forces the bandwidth of the flow to be 50% of that allocated to it by the BAM-W. Different from the Forero Paper, we consider the packets that cannot be received by the queue when paused or operating at reduced-speed as packet losses.

Figure 6:
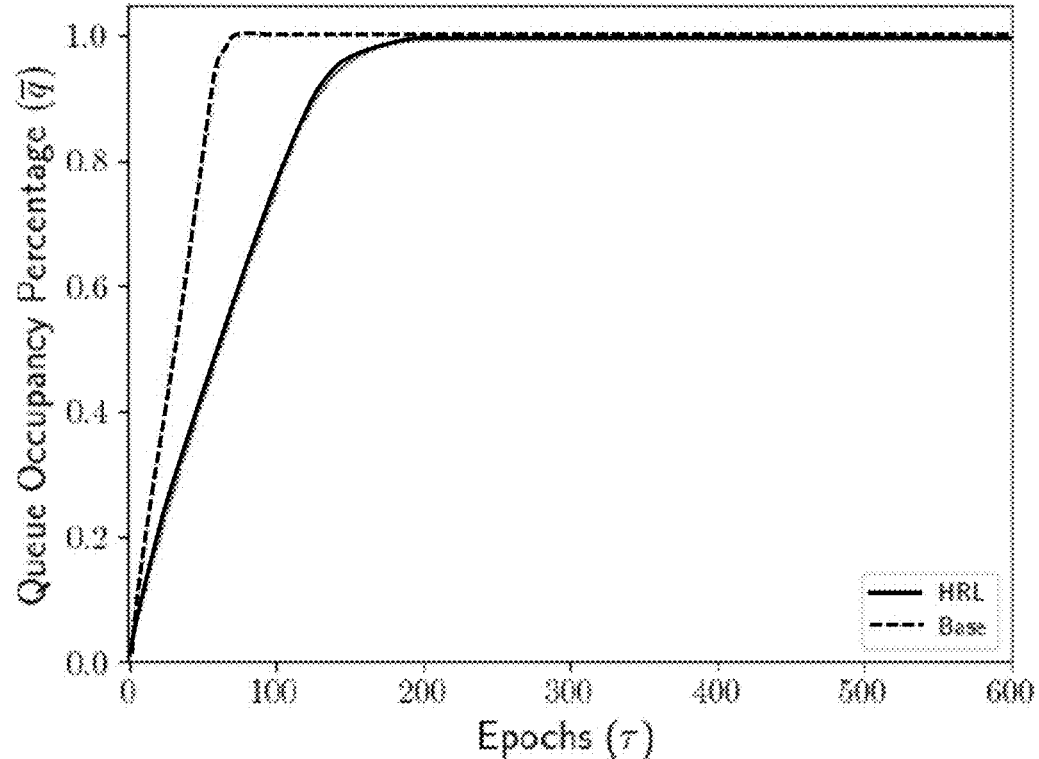
FIG. 6 is a plot of data.

We chose a fixed $w_1$ and did not use a local flow control policy as a baseline policy. The results illustrated in FIGS. 4-6 illustrate the average performance of each policy over 100 Monte Carlo runs. FIG. 4 illustrates the packet loss rate observed for the five queues when using our HRL policy and the baseline policy. The minimum sojourn time behavior across all queues was similar. Our HRL policy yields a significantly lower average packet loss rate across all queues.

FIG. 5 is a plot of data that illustrates the minimum sojourn time observed per queue for the baseline and HRL policies. After 400 epochs our HRL policy achieves a lower minimum sojourn time than the baseline, a difference of 24 minutes in the worst case and 74 minutes in the best case. It was observed also that when all the queues were full, the baseline minimum sojourn time achieved was smaller than the minimum sojourn time observed in some queues.

FIG. 6 illustrates the average queue occupancy percentage $$\bar{q} = C^{-1} \sum\nolimits_{c=1}^{C} \hat{q}_c.$$

The rate at which the queue occupancy percentage increases is lower when our HRL policy is used than when the baseline is used. For example, Queue 2 takes on average 60 epochs to reach 100% occupancy when the baseline policy is used and about 200 epochs to reach the 100% occupancy when our HRL policy is used. Note that when facing extreme congestion, our HRL policy seems to sacrifice sojourn time to prevent an increase in the packet loss rate.

Figure 7:
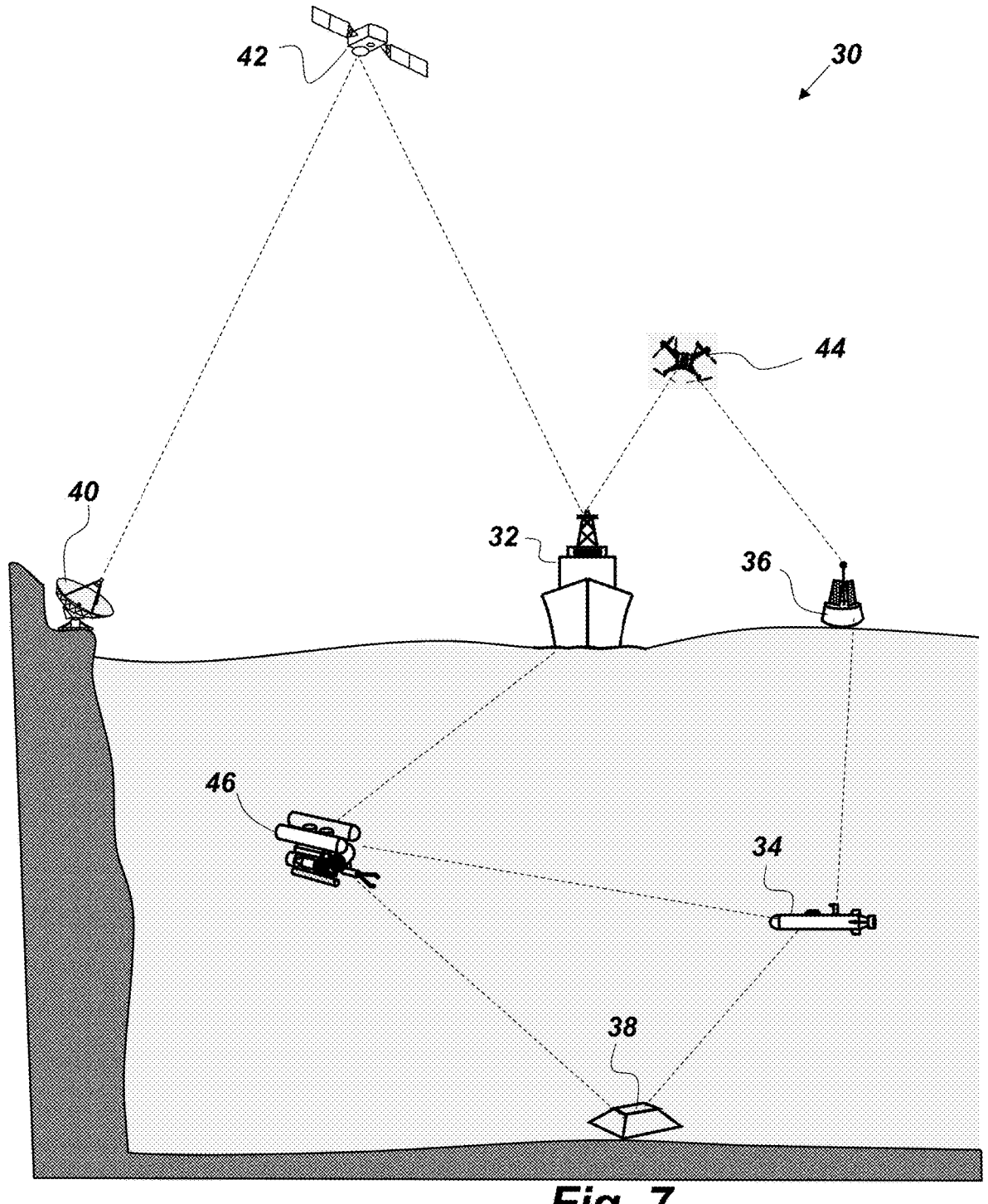
FIG. 7 is an illustration of an example embodiment of an intermittent, lossy communication network.

FIG. 7 is an illustration of an example intermittent, lossy communication network 30 with which method 10 may be used. In the example embodiment shown in FIG. 7, the network 30 is a maritime network, which includes a ship 32, an autonomous underwater vehicle 34, a buoy, 36, a seafloor sensor, 38, a land-based node 40, an earth-orbiting satellite 42, an unmanned aerial vehicle 44, and an underwater vehicle 46.

From the above description of method 10 and the HRL agent 12, it is manifest that various techniques may be used for implementing the concepts of method 10 and HRL agent 12 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 and HRL agent 12 are not limited to the particular embodiments described herein, but are capable of many embodiments without departing from the scope of the claims.

We claim:

1. A method for improving performance of an intermittent, lossy communications network comprising:

using reinforcement learning to develop a hierarchical policy framework to dynamically configure local flow-control and traffic-shaping policies in a multi-queue system, wherein the multi-queue system comprises a plurality of queues, wherein each queue is configured to handle a corresponding data flow that has a quality of service (QoS) requirement and a traffic dynamic that differ from other queues in the multi-queue system;

establishing first and second goals with a Queue System Management (QSM) policy for a Bandwidth Allocation Management (BAM) policy and a Local Flow Management (LFM) policy respectively, wherein the BAM and LFM policies have a collection of predefined traffic shaping and congestion-control policies (hereinafter referred to as BAM and LFM worker policies) available to choose from, and wherein only policies at a bottom of the hierarchical policy framework interact directly with the QSM policy;

choosing, with the BAM policy, one of the BAM worker policies that best enable the BAM policy to achieve the first goal;

choosing, with the LFM policy, one of the LFM worker policies for each queue that best enable the LFM policy to achieve the second goal;

altering the first and second goals with the QSM policy dynamically according to a current state of the plurality of queues and a surrounding environment; and wherein policies contained within the hierarchical policy framework operate at different levels of temporal resolution, with lower level policies operating at finer temporal resolutions than higher-level policies which operate at coarser temporal resolutions such that a given higher-level policy observes a coarse view of the current state that aligns with a temporal resolution at which the higher-level policy is expected to operate.

2. The method of claim 1, wherein individual instances of the LFM and the collection of LFM worker policies are deployed with each queue.

3. The method of claim 2, wherein the current state and the first and second goals are represented by respective vectors.

4. The method of claim 3, wherein the first goal is represented by a vector $\breve{g} := \breve{u} \odot g$, where $\breve{u}$ is a vector that contains an average packet loss and a largest packet sojourn-time across the multi-queue system, $\odot$ denotes a Hadamard product, and g defines a relative change in an average packet loss rate and the largest sojourn time that the QSM policy seeks to achieve.

5. The method of claim 4, wherein the second goal is represented by a vector $G := U \odot g1'_C$, where C is a total number of queues in the multi-queue system, and $U := [u_1, \ldots, u_C] \in \mathbb{R}^{2 \times C}$, where $\mathbb{R}$ is a set of real numbers.

6. The method of claim 5, wherein the BAM policy and the LFM policy have a reduced view of the current state when choosing the BAM worker policy and the LFM worker policy to achieve the first and second goals respectively.

7. The method of claim 6, wherein the BAM and LFM worker policies chosen during the choosing steps generate primitive actions that execute in a single time step.

8. The method of claim 7, wherein the step of using reinforcement learning to develop the hierarchical policy framework comprises;

using a hierarchical reinforcement learning (HRL) agent to observe the current state, wherein the HRL agent receives a reward or penalty depending on the current state;

updating the first and second goals based on the reward or penalty; and observing the current state after the first and second goals have been updated.

9. The method of claim 8, wherein the step of using reinforcement learning comprises using a Markov Decision Process (MDP) model to describe an evolution of the BAM, LFM, BAM worker, and LFM worker policies in response to the current state.

\* \* \* \* \*